United States Patent [19]

MacDonald

[11] 4,379,242
[45] Apr. 5, 1983

[54] EDDY CURRENT COUPLING HAVING ROTATING AND NON-ROTATING FLUX PATHS

[75] Inventor: Daniel J. MacDonald, Brookfield, Wis.

[73] Assignee: Litton Industries Products, Inc., Beverly Hills, Calif.

[21] Appl. No.: 203,059

[22] Filed: Nov. 3, 1980

[51] Int. Cl.³ .............................................. H02K 49/02
[52] U.S. Cl. ...................................... 310/105; 310/96
[58] Field of Search ............. 310/92, 93, 90, 96, 310/97, 101, 103–110, 67, 266, 263, 114, 166

[56] References Cited

U.S. PATENT DOCUMENTS

| | | | |
|---|---|---|---|
| Re. 27,337 | 4/1972 | Jaeschke | 310/105 |
| 2,817,029 | 12/1957 | Jaeschke | 310/96 |
| 2,838,702 | 6/1958 | Winther | 310/105 |
| 2,855,527 | 10/1958 | King | 310/105 |
| 3,012,160 | 12/1961 | Sturzenegger | 310/105 |
| 3,047,754 | 7/1962 | Jaeschke | 310/105 |
| 3,051,859 | 8/1962 | Farrell | 310/105 |
| 3,214,618 | 10/1965 | Jaeschke | 310/90 |
| 3,238,402 | 3/1966 | Fehn | 310/105 |
| 3,366,810 | 1/1968 | Cohen | 310/105 |
| 3,372,292 | 3/1968 | Lynch et al. | 310/105 |
| 3,389,278 | 6/1968 | Jaeschke | 310/105 |
| 3,423,615 | 1/1969 | Patton | 310/105 |
| 3,486,052 | 12/1969 | Jaeschke | 310/105 |
| 3,742,270 | 6/1973 | Jaeschke | 310/105 |
| 3,996,485 | 12/1976 | Jaeschke | 310/105 |

*Primary Examiner*—R. Skudy
*Attorney, Agent, or Firm*—John M. Haurykiewicz; Daniel D. Fetterley

[57] ABSTRACT

An eddy current coupling has rotating and non-rotating flux paths to use the rotating portions as both magnetic and mechanical members, reduce physical dimensions of the coupling, and improve heat dissipation from the coil.

The coupling (10) has an inductor (20) mounted on the input shaft. A magnetic rotor (22) is mounted on the output shaft with poles (30, 32) spaced from the inductor. A field coil (36) is positioned radially inwardly from the rotor and generates a flux, causing torque transmission between the inductor and rotor.

A stationary field coil support (38) is mounted in proximity to the rotor poles for providing a stationary flux return path between the poles. The support is positioned with respect to the rotating element of the coupling, so that these elements may provide a rotating flux return path in parallel with the stationary flux path of the support.

8 Claims, 2 Drawing Figures

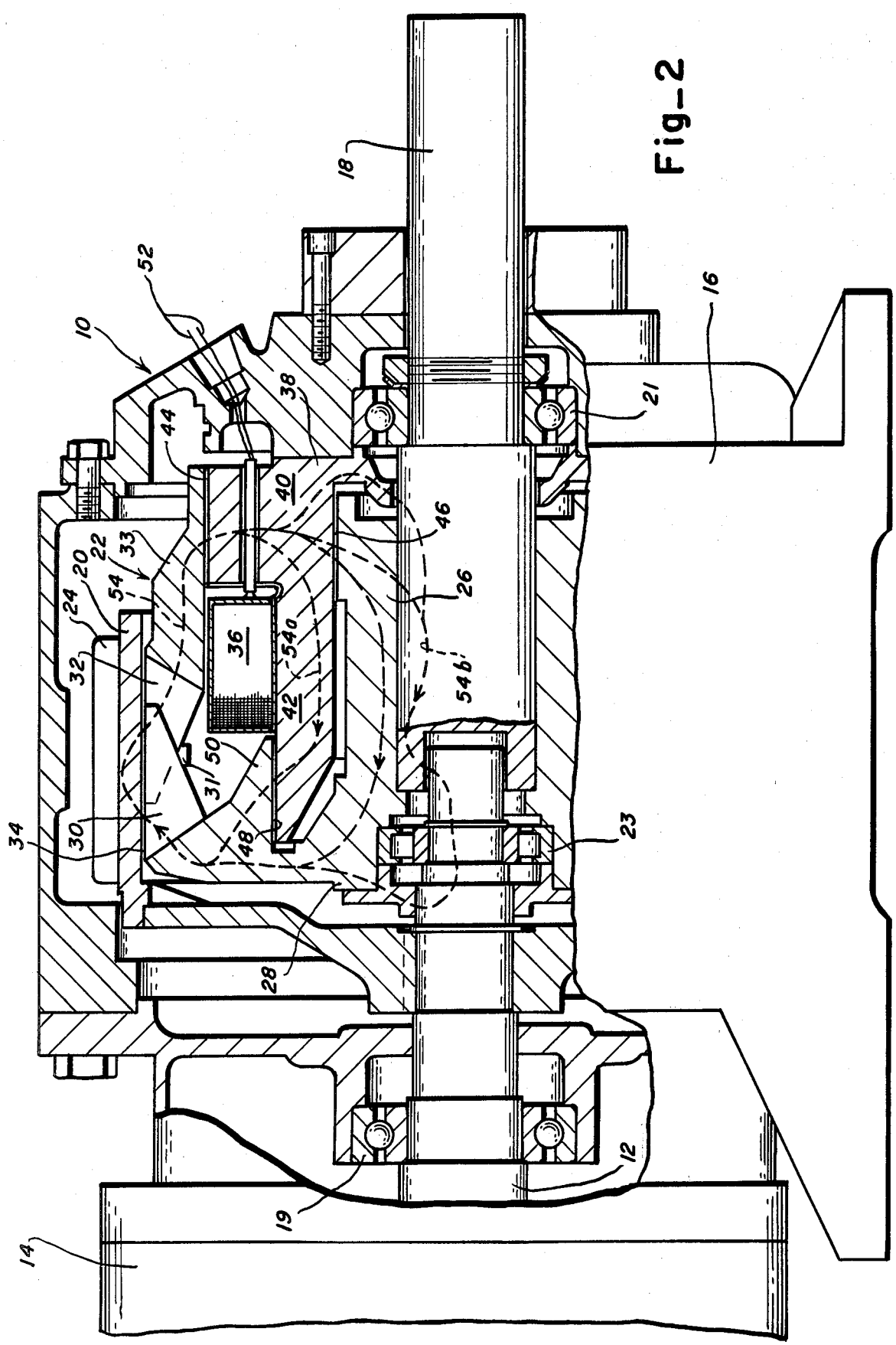

EDDY CURRENT COUPLING HAVING ROTATING AND NON-ROTATING FLUX PATHS

DESCRIPTION

Technical Field

An eddy current coupling device transmits torque between an input shaft connected to a prime mover and an output shaft connected to the load. Typically the eddy-current device is used to provide variable speed to the load when the prime mover operates at a constant speed, as is true, for example, for an a.c. induction motor.

In an eddy current coupling device, the input shaft typically rotates an inductor drum. A rotor member, commonly referred to as a pole structure, typically comprises a plurality of arcuately spaced poles and is mounted on the output shaft concentric to the inductor drum. The flux of a field coil establishes magnetic poles in the rotor and induces eddy currents in the inductor drum as long as there is a relative speed—i.e. slip—between the rotor and drum. The electromagnetic interaction of the rotor pole flux and the drum eddy currents transmits torque, or turning force. The degree of energization of the field coil determines the amount of torque transmitted between the input and output shafts for a given slip speed condition. A cooling medium, such as air or water, carries off heat generated in the coupling.

BACKGROUND ART

It is desirable in many types of couplings to locate the field coil radially inwardly of both the inductor and rotor. It is further desirable to use a stationary mounting of the field coil on the housing of the coupling to avoid the slip rings and brushes often associated with rotating coils. The reliability of brush operation is dependent on clean atmospheric conditions, sufficient humidity and proper mechanical tolerences if good electrical contact and minimum wear during rotation is to be maintained. As shown in U.S. Pat. No. 2,817,029, the inductor drum and rotor are typically formed as a concentrically mounted cup-within-a-cup to permit the stationary mounting of the field coil. The coil is typically supported by a simple bracket. However, this bracket does not provide for adequate heat dissipation from the coil.

The design configuration shown in the aforementioned patent uses a largely rotating flux path to return flux to the rotor poles and drum. This path includes the rotor support and output shaft. Accordingly, it may be noted that these parts serve both a mechanical and magnetic function, lending design economy to the configuration.

Alternatively, a largely non-rotating flux return path is known in the art, as shown in U.S. Pat. No. 3,051,859. In this patent, an enlarged coil-supporting bracket lies in the flux-return path. Improved heat dissipation is thereby provided because of greater coil contact area with the bracket, as well as improved heat conductivity in the bracket itself. The improved heat dissipation, however, is provided at a cost. Because the use of the shaft and/or rotor support as flux carrying members is lost, the axial length of the coupling device must be increased to provide the requisite total area for the flux path.

DISCLOSURE OF THE INVENTION

The present invention is, therefore, directed to an eddy current coupling device that utilizes both rotating and non-rotating members as highly efficient and effective flux-carrying members to provide the advantages of both previously described types without the disadvantages of either. It accordingly features use of the rotating portions as both magnetic and mechanical members, a reduction in the axial length of the clutch, and improved heat dissipation from the field coil. By including the coil bracket in the flux-carrying circuit, the flux-conducting volume of the instant device is maximized, permitting a reduction in the device's weight, volume, axial length and radial dimensions while maintaining maximum flux densities.

Briefly, the eddy current coupling device of the present invention includes a generally cylindrical inductor drum member mounted on one of the rotatable input and output shafts. A magnetic rotor member is mounted on the other of the input and output shafts concentric to, and radially inward from the drum. The rotor has a plurality of peripheral, arcuately spaced, magnetic poles separated from the drum by a circumferential air gap.

A field coil is positioned radially inwardly from the rotor member and surrounds the associated shaft. The field coil generates a magnetic flux which crosses the air gap between the poles and the drum. Relative speed, or slip, between the magnetic flux and the drum causes eddy currents to be generated in the drum; the reaction between the eddy-currents and the flux causes torque transmission between the inductor and rotor members and the input and output shafts.

A stationary field coil support bracket is mounted to the housing in proximity to the rotor member poles for providing a stationary flux return path between the poles. The shape and arrangement of this coil support bracket is such that it efficiently passes magnetic flux in both radial and axial directions while, at the same time, provides improved dissipation of the coil heat. The bracket is positioned with respect to the rotating elements of the coupling, typically the rotor member and associated shaft, so that these rotating elements provide a rotating flux return path in parallel with the stationary flux path of the coil support. Both the flux paths are so dimensioned as to transmit flux at maximum densities.

The rotating flux return path permits use of the rotating portions of the coupling device as both mechanical and magnetic members. The resulting use of parallel rotating and non-rotating maximum density flux paths reduces the volume and dimensions required to operate the device at desired flux levels in its central region.

BRIEF DESCRIPTION OF THE DRAWING

FIG. 2 is a detailed cross-sectional view taken along the line 2—2 of FIG. 1.

BEST MODE FOR CARRYING OUT INVENTION

Figure 1:
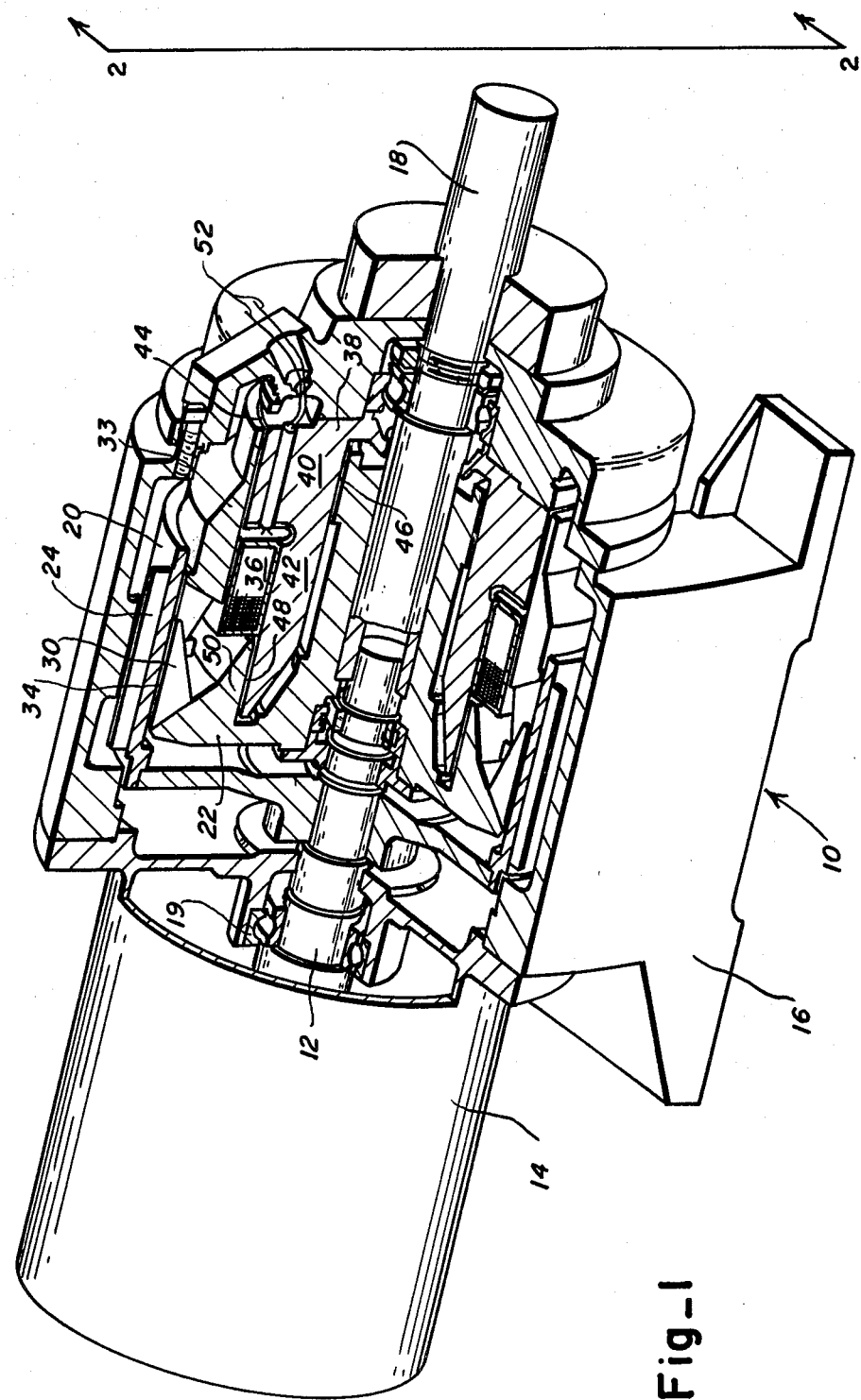
FIG. 1 is a partially cut away perspective view of an improved eddy current coupling of the present invention.

FIG. 1 shows an eddy current coupling device 10. Eddy current coupling 10 includes input shaft 12. Input shaft 12 is connected to a prime mover such as an a.c., constant speed induction motor 14 bolted to the housing 16 of the coupling device. Output shaft 18, coaxial with input shaft 12, is connected to the load, not shown, that is to be driven at variable speed.

Shaft 12 is supported by two bearings in the motor, one of which is not shown, and the other of which is identified by the reference numeral 19 in FIG. 2. The output shaft 18 is supported by a bearing 21 and by a pilot bearing 23.

The magnetic coupling between input shaft 12 and output shaft 18 takes place between an inductor drum 20 and a rotor 22, the first of which is mounted on input shaft 12 and the latter of which is mounted on output shaft 18. Because of the considerable heat generated in inductor 20, it is common to utilize the inductor as the exterior member and to mount it on constant speed input shaft 12. As illustrated in FIGS. 1 and 2, inductor drum 20 is a cup-like member of high magnetic permeability and electrical conductivity, the exterior of which is often increased in surface area by the use of fins such as the plurality of cooling fins 24.

Rotor 22, on output shaft 18, includes a collar 26 keyed to output shaft 18. A hub portion 28 extends from the collar 26 to a first set of poles 30 mounted on the periphery of rotor 22. The first set 30 and a second set of poles 32, interdigitated with the first set, are mechanically joined to opposite sides of a nonmagnetic structure, such as a band 31. Pole sets 30 and 32 are spaced from inductor 20 by circumferential air gap 34.

A field coil 36 is concentrically mounted radially within the rotor 22 on a field coil support 38. The field coil support 38 is generally L-shaped, having a short arm 40 that is fastened to the housing 16 and a longer arm 42 that extends beneath the coil 36. Coil leads 52 extend through arm 40 and housing 16 for energizing the coil.

Both arms 40, 42 contact the coil for good thermal conduction of heat away from the coil. The arm 40 forms air gap 44 with pole ring 33 that contains second set of poles 32. The arm 42 forms an air gap 46 with the rotor collar 26 and forms an air gap 48 with the flange 50 of hub portion 28. The shape and arrangement of the bracket is such that it efficiently passes magnetic flux in both radial and axial directions, while at the same time offering improved dissipation of coil heat. Naturally, a "J" or "U" shaped coil support bracket (not shown in the drawings) could be employed without departing from the spirit of the invention.

In operation, field coil 36 is energized with direct current through leads 52 to provide an encircling flux shown by the dotted lines in FIG. 2. The flux 54 passes from one pole set 30 through inductor drum 20, driven by motor 14, to the adjacent rotor pole set 32. The rotation of the drum 20 through flux 54 generates eddy currents in the drum 20. The eddy currents react with the flux to transmit torque from the drum to the rotor 22 and, accordingly, to output shaft 18. The amount of torque that can be transmitted at a given slip speed (and, therefore, at a given output speed) is determined by the field strength of the field coil 36.

The return path of flux 54 includes arm 40 of coil support 38. From there, the flux divides and passes through parallel paths; flux 54a passes through arm 42 of stationary coil support 38 and across air gap 48 to flange 50, while flux 54b passes across air gap 46, divides again between rotating collar 26 and shaft 18 and recombines in the lower portion of hub 28. Flux 54a and 54b then recombine in the upper portion of the hub 28 above flange 50. The totally recombined flux 54 then goes to pole piece set 30, across air gap 34 into drum 20, across air gap 34 into pole set 32, to pole ring 33 and across air gap 44 into arm 40 of the coil support bracket 38.

The parallel rotating and non-rotating flux paths in the coupling of the present invention accordingly utilize the rotating elements for both magnetic and mechanical purposes and permit a reduction in the dimensions required for the desired performance of the device. The rotating and non-rotating flux paths are so dimensioned as to transmit flux at maximum density through both of the paths, further enhancing the size reduction features of the present invention.

The flux flow 54a in the stationary path reduces the cross-section area needed in collar 26 and shaft 18 to return flux. This utilization of the area radially inside coil 36 permits a reduction in the coupling device diameter.

Since the flux 54a in the stationary path returns to the pole pieces via air gap 48, the axial dimension of that web portion 28 below flange 50 may be reduced because it carriers only a fraction (namely flux 54b) of the total circulating flux 54. This permits a reduction in the axial length of the coupling device 10.

The increased thickness and therefore greater heat transfer capability of coil support arm 42 more effectively removes the heat of coil 36 by conduction.

I claim:

1. An eddy current coupling comprising:
   rotatable input and output shafts;
   a generally tubular inductor member mounted on one of said input and output shafts for rotation therewith;
   a magnetic rotor member mounted on the other of said input and output shafts for rotation therewith, said rotor member being located within said inductor member and having a plurality of peripheral, arcuately spaced, poles separated from said inductor member by a circumferential air gap;
   a field coil positioned radially inwardly from said rotor member and surrounding the associated shaft, said field coil generating an encircling magnetic flux causing torque transmission between said inductor and rotor members and said input and output shafts; and
   a stationary support for said field coil, said support being in proximity to said rotor member poles for providing a stationary field coil flux return path between said poles, said support being positioned with respect to the rotating elements of the coupling for dividing the flux between a field coil flux return path in the rotating elements in parallel with the stationary flux return path of said support, said stationary support and rotating elements being so dimensioned as to provide flux return paths transmitting flux at maximum density.

2. The coupling according to claim 1 wherein said support is further defined as positioned with respect to at least one of said rotor member and associated shaft for providing the rotating flux return path.

3. The coupling according to claim 2 wherein said coil support has a first porton forming a flux transmitting air gap with respect to said rotor member or shaft to establish the rotating flux return path and a second portion forming a flux transmitting air gap with respect to said rotor member adjacent said poles to establish the stationary flux return path.

4. The coupling according to claim 3 wherein said rotor member has a collar mounted on said shaft and a radially extending hub portion positioning said poles at the circumferential air gap and wherein said first portion of said coil support forms an air gap with respect to said collar and said hub portion has a flange at the outer end thereof forming an air gap with respect to said second portion of said coil support.

5. The coupling according to claim 3 wherein said coil support is generally L-shaped for receiving said coil and forming said air gaps.

6. The coupling according to claim 3 wherein said coil support is generally J-shaped for receiving said coil and forming said air gaps.

7. The coupling according to claim 3 wherein said coil support is generally U-shaped for receiving said coil and forming said air gaps.

8. The coupling according to claim 1 wherein said rotor member is mounted on said output shaft.

* * * * *